(12) United States Patent
Case et al.

(10) Patent No.: US 6,434,635 B1
(45) Date of Patent: Aug. 13, 2002

(54) METHODS, APPARATUS, AND COMPUTER PROGRAM PRODUCT FOR DATA TRANSFER USING A SCATTER-GATHER LIST

(75) Inventors: Timothy Case, West Chester; Richard Coffman, Phoenixville, both of PA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/302,044

(22) Filed: Apr. 29, 1999

(51) Int. Cl.[7] .............................................. G06R 13/14
(52) U.S. Cl. ........................ 710/23; 710/62; 710/103; 712/300
(58) Field of Search .............................. 710/5, 23, 62, 710/26, 103; 712/300

(56) References Cited

U.S. PATENT DOCUMENTS

| | | | | |
|---|---|---|---|---|
| 4,573,141 A | * | 2/1986 | Simon | |
| 5,168,561 A | * | 12/1992 | Vo | 710/22 |
| 6,026,191 A | * | 2/2000 | Ohara | 382/232 |
| 6,078,694 A | * | 6/2000 | Takahashi et al. | 382/238 |
| 6,145,017 A | * | 11/2000 | Ghaffari | 710/5 |
| 6,148,350 A | * | 11/2000 | Chen et al. | 710/62 |

* cited by examiner

*Primary Examiner*—Jeffrey Gaffin
*Assistant Examiner*—Abdelmomem Elam
(74) *Attorney, Agent, or Firm*—Lise A. Rode; Michael B. Atlass; Mark T. Starr (57) ABSTRACT

A scatter-gather list is used to control the transfer of a buffer of data of length L from a first memory to a second memory, such that a pad of length P is inserted after each of successive portions of length S of the data are transferred.

21 Claims, 6 Drawing Sheets

METHODS, APPARATUS, AND COMPUTER PROGRAM PRODUCT FOR DATA TRANSFER USING A SCATTER-GATHER LIST

COPYRIGHT AND TRADEMARK NOTICES

A portion of the disclosure of this patent document contains material that is subject to copyright protection. The copyright owner has no objection to the facsimile reproduction by anyone of the patent document or the patent disclosure as it appears in the U.S. Patent & Trademark Office patent file or records, but otherwise reserves all copyright rights whatsoever.

Intel, Pentium, and i960 are registered trademarks of Intel Corporation. StrongARM is a trademark of Advanced RISC Machines, Ltd. IxWorks is a trademark of Wind River Systems. I$_2$O SIG is a trademark of the I$_2$O Special Interest Group. Alpha is a trademark of Compaq Computer Corporation. ClearPath is a trademark of Unisys Corporation.

BACKGROUND

1. Field of the Invention

The present invention is directed to computer systems, and more particularly, to methods, apparatus, and computer program products for transferring data between computer system elements in multiple buffers. In general, the present invention addresses situations where the size of the source and destination buffers is fixed, but the source buffer size differs from the destination buffer size.

2. Description of the Prior Art

Data transfers from one memory to another memory in a computer system, particularly where the formats of the two memories differ, sometimes require that a pad (i.e., some pattern of data) be inserted periodically after successive portions of the data are transferred. Other transfers require the removal of this pad as the transfer takes place. Typically, the pad helps to bridge the incompatibilities between memory formats. For example, copending, commonly assigned application Ser. No. 09/144,300, filed Aug. 31, 1998 now abandoned, entitled "Improved Method For Providing Variable Sector-Format Operation To A Computer System" describes a technique in which padding is used to enable a Unisys ClearPath HMP NX enterprise server, which stores data in its internal memory in logical sectors of 180 bytes, to transfer a buffer of data to an attached storage device in which data is arranged in physical sectors of 512 bytes. The Unisys ClearPath HMP NX enterprise server runs under the control of the Unisys MCP operating system and is sometimes also referred to as an MCP server.

Figure 1:
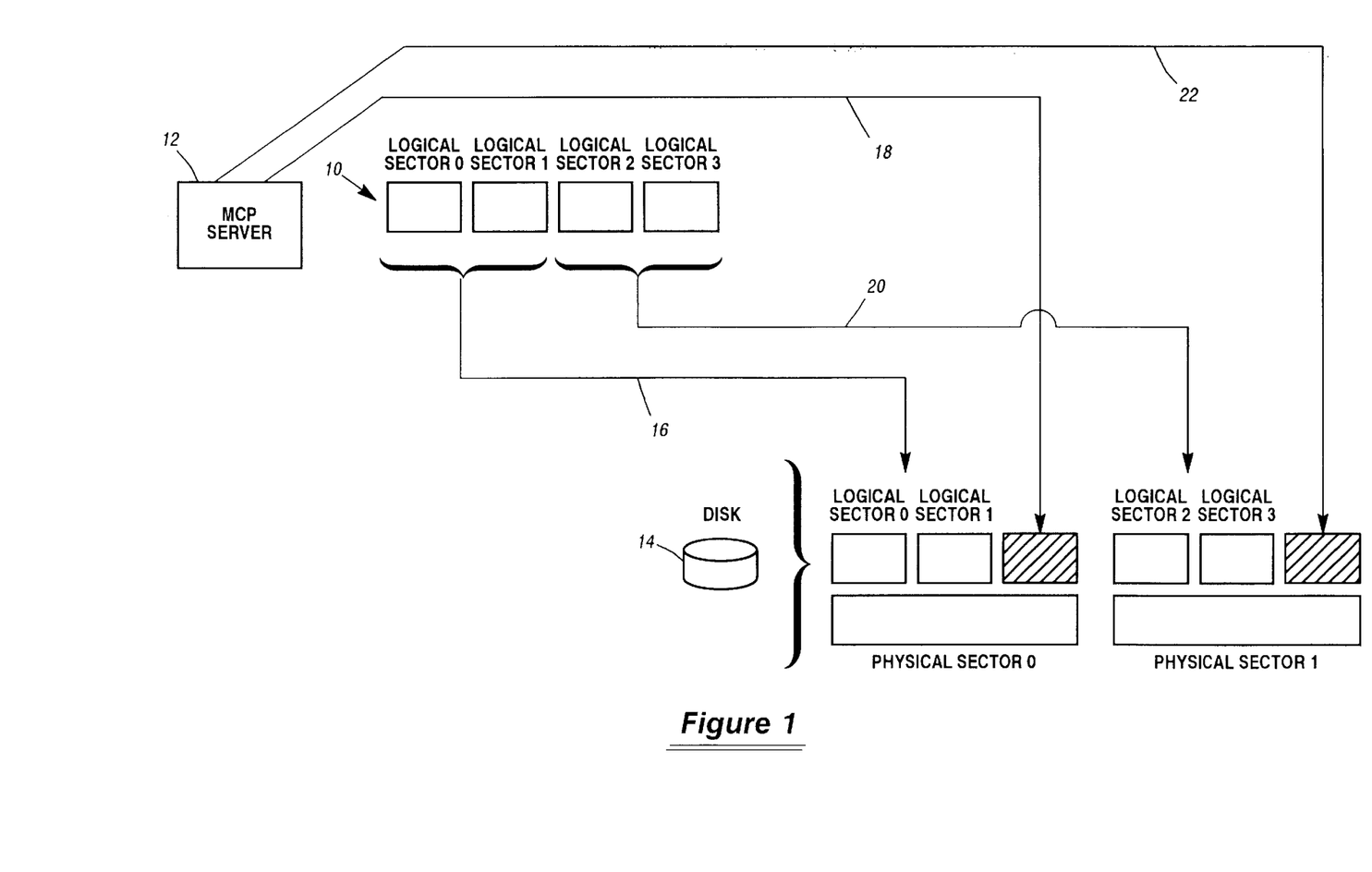
FIG. 1 illustrates a prior art example of a data transfer in which the data is padded during transfer from a first memory to a second memory.

FIG. 1 illustrates the padding technique described in the copending application. In the example shown, assume that it is desired to write four logical sectors of data from an application program buffer 10 in an MCP server 12 to an attached storage medium, such as a disk 14, having a physical sector format that differs in size from the logical sectors in the memory of the MCP server. Specifically, in this example, only two logical sectors will fit within one physical sector, leaving a portion of the physical sector unfilled. According to the method described in the copending application, this mismatch between formats is handled by transferring successive pairs of logical sectors to the storage medium, each followed by a pad of data (152 bytes) that fills out the remainder of the respective physical sectors into which the pairs of logical sectors are stored.

More specifically, the MCP server 12 will make a write request addressed to logical sector 0 of the buffer 10, with a specified length of four logical sectors. The logical sector request is mapped to the corresponding physical sectors of the disk 14—in this example, physical sectors 0 and 1. The input/output subsystem of the MCP server 12 will begin the transfer (step 16) by writing logical sectors 0 and 1 to physical sector 0 of the disk. The I/O subsystem will then automatically insert a pad of data (the striped area following logical sector 1) to fill-out the remainder of physical sector 0 (step 18). Then, logical sectors 2 and 3 will be written to the next physical sector (step 20), again automatically followed by a pad of data to fill-out the remainder of that physical sector (step 22).

In general terms, the kind of transfer illustrated in FIG. 1 can be described as the transfer of a buffer of data of length L from a first memory (e.g., main memory) to a second memory (e.g., disk 14), wherein a pad of length P is inserted after each successive portion of length S of the data is transferred. In the example of FIG. 1, the length S of each successive portion of data transferred is 360 bytes (i.e., two logical sectors) and the length P of the pad is 152 bytes (i.e., the size of the remaining unfilled portion of each physical sector). The need for this kind of transfer exists in numerous other computer systems for a variety of reasons, and the foregoing is just one example.

Figure 2:
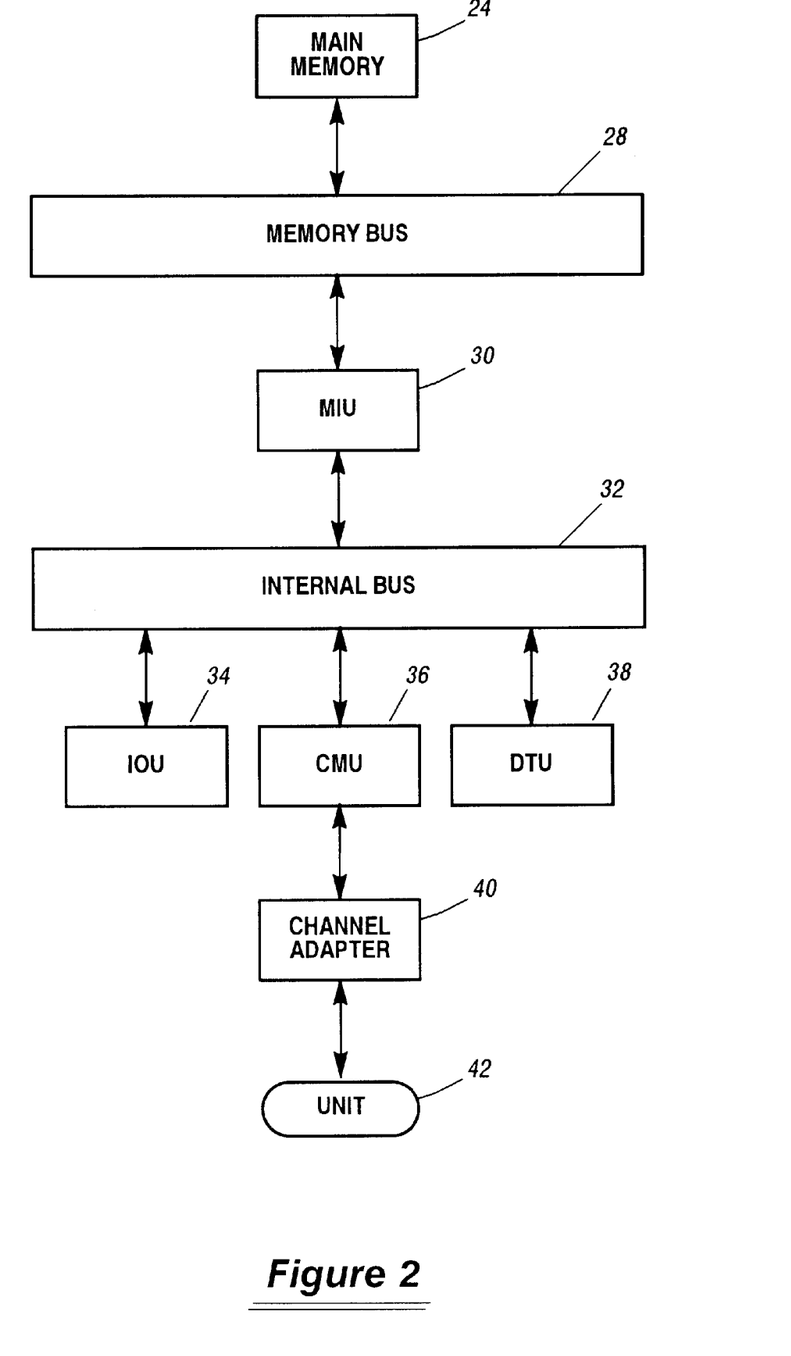
FIG. 2 is a block diagram illustrating a prior art computer system in which a padding function such as that illustrated in FIG. 1 is implemented in proprietary hardware of the system.

In Unisys ClearPath HMP NX enterprise servers, the capability to insert a pad after successive portions of a buffer of data are transferred is implemented in hardware. FIG. 2 is a block diagram illustrating the basic architecture of a ClearPath HMP NX enterprise server. As shown, a main memory 24 is coupled to a memory interface unit (MIU) 30 via a memory bus 28. The MIU 30 is coupled to several other processors via an internal bus 32. The other processors include an input/output unit (IOU) 34, a channel management unit (CMU) 36, and a data transfer unit (DTU) 38. The CMU 36 is further connected to an I/O channel adapter 40. A peripheral unit 42, such as a disk drive or other secondary storage medium, connects to the I/O channel adapter 40. It should be noted that in addition to IOU 34, which is an input/output unit, the entire module, including the MfU 30, the IOU 34, the CMU 36, and the DTU 38 is referred to as an input/output module (IOM).

The MIU 30 provides the interface between the above mentioned processors and units and the main memory 24. The MIU 30 handles the buffering and issuing of addresses to main memory 24 for store and fetch operations. The MWU 30 also handles translation between logical and physical addresses and arbitration of a plurality of requests from the memory 24.

The CMU 36 manages data movement between the main memory 24 and any peripheral I/O units (e.g., disks and tape drives) which may be coupled to the processing system. The CMU 36 communicates with external channels, such as the channel adapter 40, through a channel service bus (not shown). The DTU 38 controls block data transfer from one location in main memory 24 to another upon the request of the IOU 34. The DTU 38 is also used for disk caching.

The IOU 34 performs high level I/O functions, such as the scheduling of I/O jobs, the selection of data paths over which I/O jobs are performed, the gathering of job statistics, and the management of I/O devices and of a disk cache. The IOU 34 determines whether padding is required during transfer of a buffer of data from main memory to a peripheral unit 42, such as a disk drive. For example, the IOU 34 detects when a disk unit having a 512 byte physical sector format is attached to the channel adapter 40 and programs subsequent data transfers to the disk unit so that the padding method illustrated in FIG. 1 is employed. The actual padding operation is carried out by proprietary hardware on the channel adapter 40. Specifically, the hardware on the adapter is programmable to insert P bytes of data after every S bytes of data is transferred from the main memory 24 to the peripheral unit 42.

Today, there is an ever increasing push for companies in the computer industry to supply systems that are built using industry standard components, relying less on proprietary designs. One area in which this trend is strong is input/output processing. There have been a number of industry-wide initiatives to develop standard specifications for the design and operation of input/output devices and sub-systems. For example, the computer industry has recently begun to adopt and to implement solutions based on the Intelligent I/O ($I_2O$) Architecture Specification, which describes standard specifications for the development of intelligent I/O adapters and associated device driver software.

Figure 3:
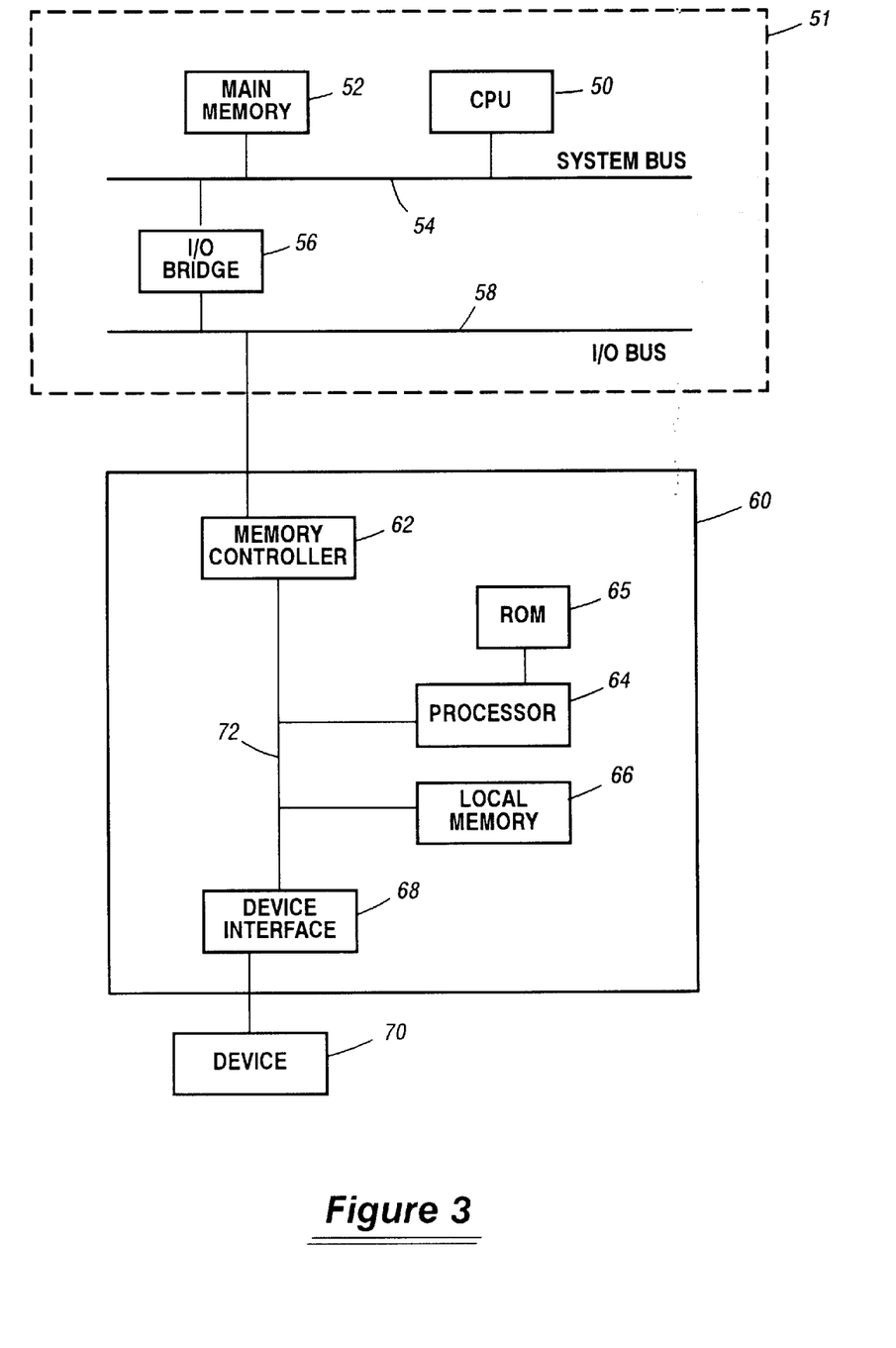
FIG. 3 is a block diagram of a computer system based on so-called "open" standards, including a block diagram of an input/output adapter in which the present invention may be embodied.

FIG. 3 is a block diagram illustrating a typical computer system configuration based on more common industry standards. As shown, the typical computer system comprises a central processing unit (CPU) 50 and a main memory 52 that communicate over an internal system bus 54. The CPU 50 may be implemented using any of a number of microprocessors available from various companies, including, for example, Intel® Pentium® processors, Compaq/DEC Alpha microprocessors, etc. Some systems may comprise more than one CPU 50. An I/O bridge 56 interfaces the system bus 54 to an input/output bus 58. The input/output bus is typically based on an industry standard specification, such as the Peripheral Component Interconnect (PCI) specification. The system may also have one or more adapter cards connected to the input/output bus 58. FIG. 3 shows a so-called "intelligent" input/output adapter 60 that can be used to provide an interface between the input/output bus 58 of the computer system and some peripheral input/output device 70. The input/output adapter 60 typically includes a memory controller 62, such as a Direct Memory Access (DMA) controller, that handles the transfer of data from the main memory 52 of the computer system to the peripheral device 70. "Intelligence" is usually provided by an embedded processor 64, such as an i960® or StrongARM® processor available from Intel Corporation, and an associated local memory 66, both of which are attached to a local bus 72 on the adapter 60. Some sort of device interface 68 provides the necessary interface circuitry to the peripheral device 70. For example, the device interface circuitry 68 might comprise a PCI-to-SCSI conversion to enable Small Computer Systems Interface (SCSI) peripherals to be attached to the computer system 51 via the adapter card 60.

Although the use of industry standard components in an adapter card offers the advantages of lower cost and wider interoperability with the hardware of other vendors, functionality may be limited by the capabilities of the available, industry-standard components. This can be problematic in situations in which a vendor that previously relied upon proprietary solutions to provide certain functionality must now offer similar functionality using industry-standard components that may not directly support that functionality.

The ability to pad data during transfers from one memory to another, as illustrated by way of example FIG. 1, is one example of functionality that typically is not found in current industry-standard input/output components, such as Direct Memory Access (DMA) controllers and the like. As mentioned above, Unisys corporation has provided this capability in the past using proprietary hardware components. Consequently, there is a need for methods and apparatus for inserting a pad of data of length P after successive portions of a buffer of data are each transferred from a first memory to a second memory, which methods and apparatus are not limited to implementation via proprietary designs. Additionally, it would be desirable if any such methods and apparatus could achieve the desired padding with minimal additional processing overhead. The present invention satisfies this need.

SUMMARY OF THE INVENTION

The present invention is directed to methods and apparatus for transferring a buffer of data of length L from a first memory to a second memory such that a pad of length P is inserted after each successive portion of length S of the data is transferred. More specifically, in accordance with the present invention, a scatter-gather list is generated and then used to control the transfer of a buffer of data such that a pad of length P is effectively inserted after each successive portion of length S of the data is transferred. For transfers in the reverse direction, the pad is stripped.

In one embodiment of a method of the present invention, a scatter-gather list is generated that comprises two scatter-gather list elements for each successive portion of length S of a data buffer to be transferred. The number of successive portions of length S in a buffer of length L can be expressed as: (L+(S−1)) DIV S. In this embodiment, the first element for a given successive portion of length S specifies the transfer of that portion (e.g., by indicating the start of that portion and a length for the transfer of S). The second scatter-gather list element for that portion of the buffer specifies the transfer of a predetermined memory location of length P (i.e., the length of the desired pad). Preferably, the predetermined memory location that is used to define the pad is the same for each successive portion of length S of the data. In an embodiment wherein the present invention is implemented in an input/output adapter having a local memory, the predetermined memory location that is used to define the pad preferably resides in the local memory. In other embodiments, however, the predetermined memory location could be defined elsewhere, such as, for example, in the main memory of a computer system.

In another embodiment of the method of the present invention, a scatter-gather list is generated that comprises only one scatter-gather list element for each successive portion of length S of a data buffer to be transferred. Again, the number of successive portions of length S in a buffer of length L can be expressed as: (L+(S−1)) DIV S. In this embodiment, each scatter-gather list element specifies a transfer that starts at the beginning of its respective portion and has a length of S plus P (length=S+P). For each scatter-gather list element, the first S words to be transferred constitute the actual data and the last P words form the required pad. Because each successive portion and its respective pad are transferred using a single scatter-gather list element in this embodiment, the desired result is achieved using half the number of scatter-gather list elements as the previously described embodiment.

An input/output adapter in accordance with the present invention comprises a memory controller of a type capable of transferring data in accordance with a scatter-gather list, and a processor for generating a scatter-gather list to control the transfer of a buffer of data from a first memory to a second memory such that a pad of length P is inserted after each successive portion of length S of the data in the buffer is transferred to the second memory. The scatter-gather list may be generated by the processor in accordance with either of the embodiments described above.

Preferably, the processor is made to function in accordance with the present invention by executing program code stored on a computer-readable medium, such as, for example, a read-only-memory coupled to the processor. Again, the program code may implement either of the embodiments of the method described above in generating the required scatter-gather list. As stored on such a computer-readable medium, the program code forms a computer program product.

Additional features and advantages of the present invention will become evident hereinafter.

BRIEF DESCRIPTION OF THE DRAWINGS

The foregoing summary, as well as the following detailed description of the preferred embodiment, is better understood when read in conjunction with the appended drawings. For the purpose of illustrating the invention, there is shown in the drawings an embodiment that is presently preferred, it being understood, however, that the invention is not limited to the specific methods and instrumentalities disclosed. In the drawings.

DETAILED DESCRIPTION OF THE PREFERRED EMBODIMENT

In most computer systems, the memory of a data buffer can be "scattered," rather than contiguous, and allocated as page frames. That is, different "fragments" of the buffer may physically reside at different memory locations. When transferring a "scattered" buffer of data from, for example, the main memory of a host computer to a secondary storage device, it is necessary to "gather" the different fragments of the buffer so that they preferably can be transferred to the secondary storage device in a more contiguous manner. Scatter-gather lists are commonly used for this purpose. Each element of a scatter-gather list points to a different one of the buffer fragments, and the list effectively "gathers" the fragments together for the required transfer. A memory controller, such as a Direct Access Memory (DMA) controller, then performs the transfer as specified in each successive element of the scatter-gather list. The present invention represents an inventive new use for scatter-gather lists, as described more fully below.

The present invention is directed to methods and apparatus for transferring a buffer of data of length L from a first memory to a second memory such that a pad of length P is inserted after each successive portion of length S of the data is transferred. More specifically, in accordance with the present invention, a scatter-gather list is generated and then used to control the transfer of a buffer of data such that a pad of length P is effectively inserted after each successive portion of length S of the data is transferred. By employing a scatter-gather list to control the transfer in this manner, the present invention can be implemented using either proprietary components or industry-standard components, so long as they support some form of scatter-gather list processing.

The methods and apparatus of the present invention may take the form of program code (i.e., instructions) embodied in tangible media, such as floppy diskettes, CD-ROMs, hard drives, ROMs, PROMs, EEPROMs or any other machine-readable storage medium, wherein, when the program code is loaded into and executed by a machine, such as a computer or processor, the machine becomes an apparatus for practicing the invention. The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Figure 4:
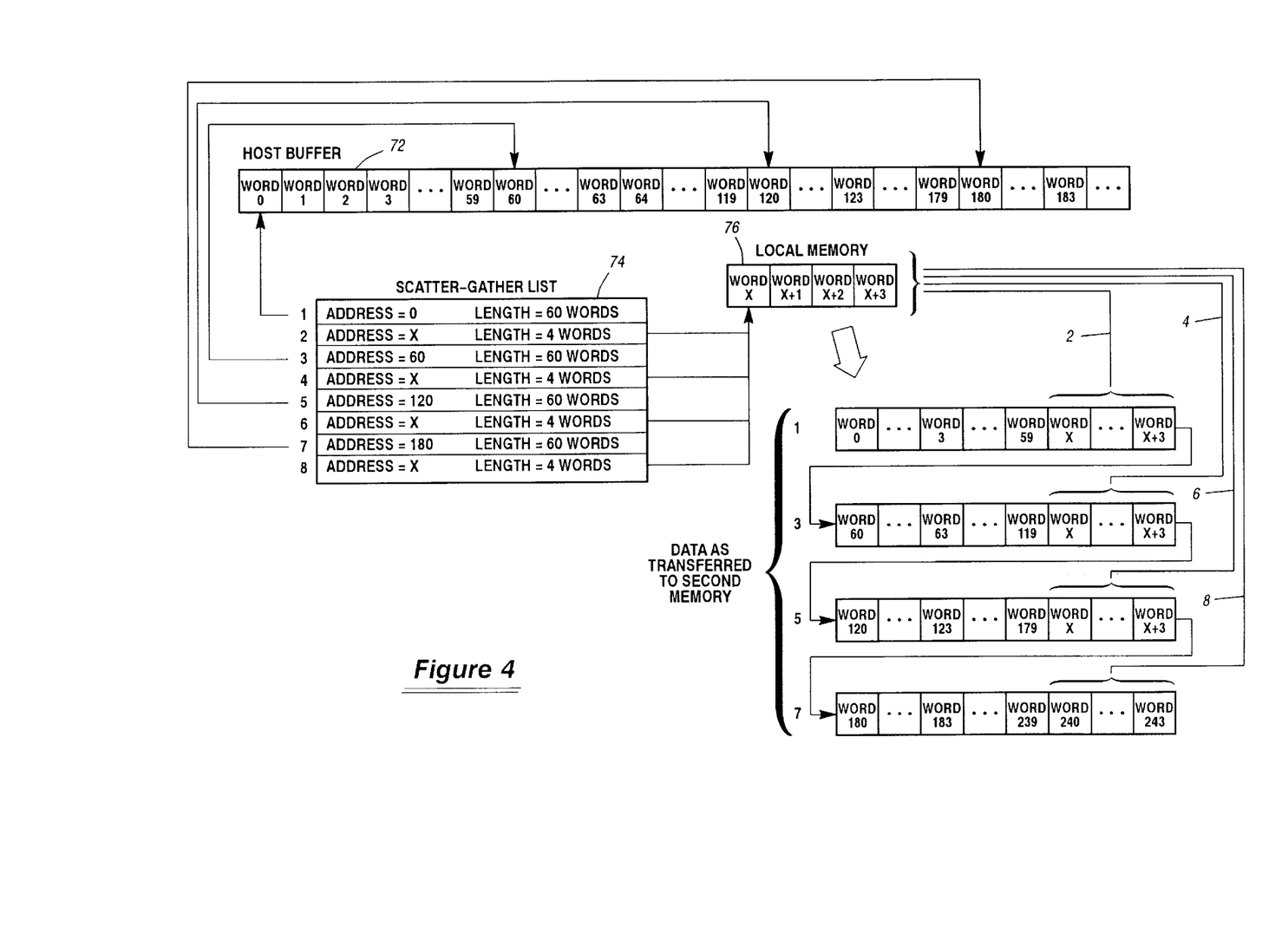
FIG. 4 illustrates one embodiment of a method of the present invention.

Referring to the drawings, wherein like numerals represent like elements throughout, FIG. 4 illustrates one embodiment of the use of a scatter-gather list in accordance with the method of the present invention. By way of example in FIG. 4, assume that a host buffer 72 having a length, L, of 240 words (word 0, word 1, word 2, ... word 239) needs to be transferred from a first memory to a second memory in such a manner that a pad having a length, P, of four (4) words is inserted after every sixty (60) words of the buffer are transferred (i.e., after every successive portion of length S, wherein S=60 words).

According to this first embodiment of the present invention, a scatter-gather list 74 is generated that comprises two scatter-gather list elements for each successive portion of length S to be transferred. The number of successive portions of length S in a buffer of length L can be expressed as: (L+(S−1)) DIV S. In the present example, where L equals 240 words and S equals 60 words, there are four successive portions to be transferred. Consequently, in the embodiment of the present invention illustrated in FIG. 4, the scatter-gather list 74 comprises eight scatter-gather list elements, two for each successive portion to be transferred. These elements are labeled "1" through "8," as shown.

Further according to this embodiment, the first element for a given successive portion of length S specifies the transfer of that portion (e.g., by indicating the start of that portion and a length for the transfer of S). For example, the first scatter-gather list element in FIG. 4, element "1", specifies a transfer starting at word 0 and having a length of 60 words. The second scatter-gather list element for that portion of the buffer, element "2," specifies the transfer of a predetermined memory location 76 of length P (i.e., the length of the desired pad), which in the present example is four (4) words. Similarly, for the next successive portion of the buffer (i.e., words 60–119), element "3" of the scatter-gather list specifies the transfer of that portion (i.e., a transfer starting at word 60 for a length of 60 words), and element "4" specifies the transfer of the same four word pad. As shown, the predetermined memory location 76 that is used to define the pad is the same for each successive portion of length S of the data, and therefore, scatter-gather list elements "2," "4," "6," and "8" are identical. In an embodiment wherein the present invention is implemented in an input/output adapter having a local memory (e.g., local memory 66 of the input/output adapter 60 of FIG. 3), the predetermined memory location that is used to define the pad preferably resides in the local memory. In other embodiments, however, the predetermined memory location could be defined elsewhere, such as, for example, in the main memory of the computer system.

Once the scatter-gather list has been generated, the transfer is performed in accordance with the list elements. Any device capable of executing a data transfer in accordance with a scatter-gather list can be employed, such as, for example, a Direct Memory Access memory controller or the like. As illustrated in FIG. 4, the transfer proceeds as follows. Element "1" of the scatter-gather list causes words 0–59 to be transferred to the second memory. Element "2" of the scatter-gather list causes the four words of predetermined memory location 76 to be transferred, thus forming the pad for words 0–59. Next, element "3" of the scatter-gather list causes the next successive portion of the buffer, words 60–119, to be transferred to the second memory. Element "4" then causes the same four words at the predetermined memory location 76 to be transferred to form the pad for words 60–119. Next, element "5" of the scatter-gather list causes words 120–179 to be transferred, and element "6" again transfers the same four words at predetermined memory location 76 to form the required pad. Elements "7" and "8" of the scatter-gather list cause a similar transfer to occur for the next successive portion of the buffer, words 180–239, and its pad.

Figure 5:
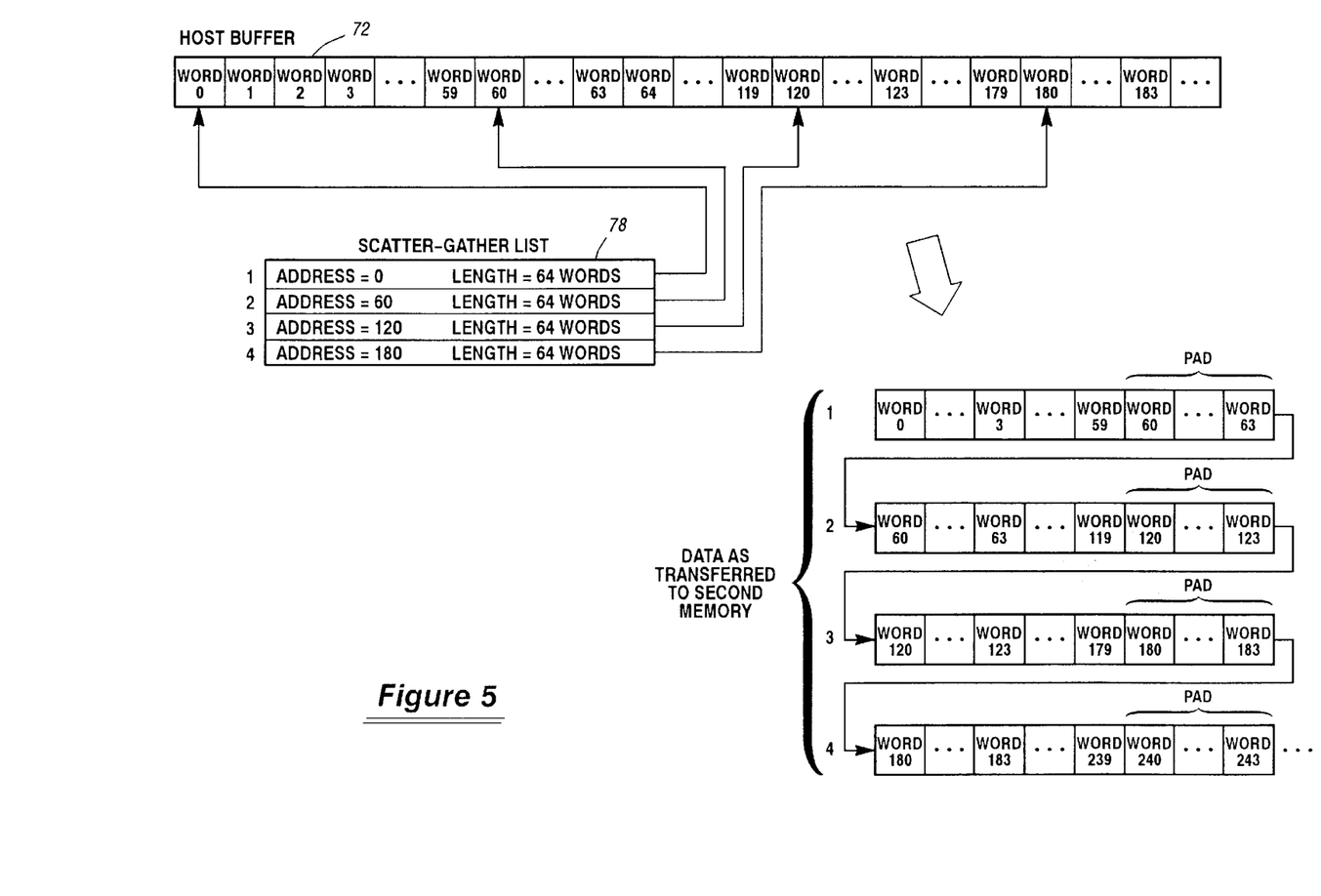
FIG. 5 illustrates another embodiment of the method of the present invention.

FIG. 5 illustrates a second embodiment of the use of a scatter-gather list in accordance with the method of the present invention. As in FIG. 4, assume again that a host buffer 72 having a length, L, of 240 words (word 0, word 1, word 2, . . . word 239) needs to be transferred from a first memory to a second memory in such a manner that a pad having a length, P, of four (4) words is inserted after every sixty (60) words of the buffer are transferred.

According to this second embodiment of the present invention, a scatter-gather list 78 is generated that comprises only one scatter-gather list element for each successive portion of length S to be transferred. Again, the number of successive portions of length S in a buffer of length L can be expressed as: (L+(S−1)) DIV S. In the present example, where L equals 240 words and S equals 60 words, there are four successive portions to be transferred. Consequently, in this embodiment, the scatter-gather list 78 comprises four scatter-gather list elements, one for each successive portion to be transferred. These elements are labeled "1" through "4," as shown.

Further according to this embodiment, each scatter-gather list element specifies a transfer that starts at the beginning of its respective portion and has a length of S plus P (length= S+P). Thus, in the example of FIG. 5, the first scatter-gather list element, element "1", specifies a transfer starting at word 0, the beginning of the first sixty word portion of the buffer, and having a length of sixty-four (64) words (S+P, where S=60 words, P=4 words). The next scatter-gather list element, element "2", specifies a transfer starting at word 60, the beginning of the next successive portion of the buffer, and again having a length of S plus P (64 words). Each subsequent scatter-gather list element specifies the start of its respective portion of the buffer and a similar length of S plus P, as shown.

Once the scatter-gather list 78 has been generated, the transfer is performed in accordance with the list elements. Again, any device capable of executing a data transfer in accordance with a scatter-gather list can be employed. As illustrated in FIG. 5, the transfer proceeds as follows. Element "1" of the scatter-gather list causes words 0–63 to be transferred to the second memory. Words 0–59 of this transfer constitute the actual data for this first portion of the buffer and words 60–63 form the pad. Element "2" of the scatter-gather list causes the next transfer to begin at word 60 and again to have a length of sixty-four words. Consequently, words 60–123 will be transferred. Similar to the first transfer, the first sixty words of this transfer, words 60–119, constitute the actual data, and words 120–123 represent the four word pad. The next scatter-gather list element, element "3", begins another 64 word transfer starting at word 120. Element "4" begins the last sixty-four word transfer starting at word 180.

For each transfer, the first sixty words constitute the actual data and the last four words form the required four word pad. Because of the overlapping nature of these transfers, the four words that form the pad at the end of one transfer are the same as the first four words of data of the next transfer. However, because the host computer will never see the four word pad, it does not matter what data is written to this area. This embodiment of the present invention therefore achieves the desired result using half the number of scatter-gather list elements as the embodiment illustrated in FIG. 4.

The method of the present invention can be implemented in an intelligent input/output adapter, such as that illustrated in FIG. 3, in which case the input/output adapter becomes an apparatus for practicing the invention. In greater detail, with reference to FIG. 3, an input/output adapter 60 in accordance with the present invention comprises a memory controller 62 of a type capable of transferring data in accordance with a scatter-gather list, and a processor 64 for generating a scatter-gather list to control the transfer of a buffer of data of length L from a first memory (e.g., main memory 52 of the host computer) to a second memory (e.g., device 70) such that a pad of length P is inserted after each successive portion of length S of the data in the buffer is transferred to the second memory.

The processor 64 is preferably an embedded microprocessor, such as the i960® processor or the StrongARM® processor, both available from Intel Corporation. Preferably, the processor 64 is controlled by a real time operating system (RTOS), such as, for example, the IxWorks® operating system available from Wind River® Systems. In this embodiment, the program code that implements the present invention runs "on top of" the RTOS and takes advantage of the basic functionality provided by the RTOS. However, an operating system of this type is not a necessity. When employed, operating system code may reside in a read-only-memory (ROM) 65 or other suitable storage device.

The memory controller 62 preferably comprises a Direct Memory Access (DMA) memory controller. In one particular implementation, the memory controller 62 and processor 64 may be integrated in a single device. For example, the i960® RP microprocessor available from Intel Corporation incorporates a DMA controller and an i960® processor core in a single chip.

Preferably, the processor 64 functions in accordance with the present invention by executing program code (not shown) that may also be stored in the ROM 65. In other embodiments, the program code may be stored in other memory locations. The program code may implement either of the embodiments illustrated in FIGS. 4 and 5. Alternatively, the processor 64 and its functionality can be implemented in the form of hard-wired circuitry.

Figure 6:
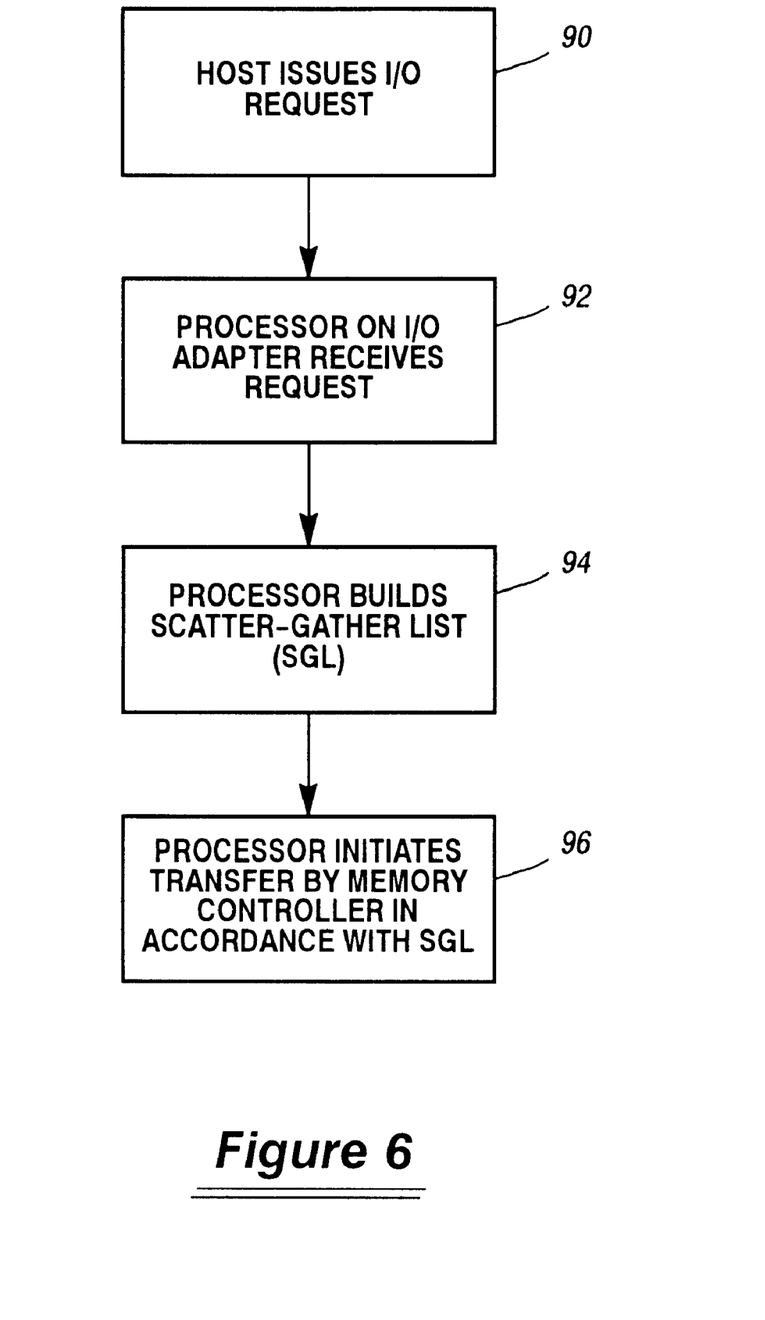
FIG. 6 is a flow diagram illustrating the operation of an input/output adapter in accordance with the present invention and providing additional details concerning the method of the present invention.

FIG. 6 is a flow diagram illustrating the operation of the input/output adapter 60 in accordance with the present invention, and also providing additional details of a preferred embodiment of the method of the present invention. Referring to both FIGS. 3 and 6, in step 90, the host computer 51 issues an input/output request to transfer a buffer of data of length L from its main memory 52 (the first memory) to the device 70 (the second memory) via input/output adapter 60. At step 92, the processor 64 on the input/output adapter 60 receives the transfer request. Next, at step 94, in accordance with the present invention, the processor 64 builds a scatter-gather list to perform the transfer such that a pad of length P will be inserted after each successive portion of length S of the data is transferred from the main memory 52 to the device 70. Either one of the techniques illustrated in FIGS. 4 and 5 can be used to generate the scatter-gather list. At step 96, the processor 64 initiates a transfer by the memory controller 62 in accordance with the generated scatter-gather list. Once the transfer is complete, a notification may be provided to the host computer 51. As mentioned above, steps 92–96 of this process, including the generation of a scatter-gather list in accordance with either of the embodiments illustrated in FIGS. 4 and 5, may be implemented in the form of program code that the processor 64 executes to perform these steps. The program code can be stored in ROM 65 or on other computer readable mediums, such as floppy diskettes, CD-ROMs, DVD-ROMs, hard drives, ROMs, PROMs, EEPROMs, flash memory devices, etc.

In a preferred embodiment of an input/output adapter according to the present invention, the input/output adapter is designed in accordance with the Intelligent I/O ($I_2O$) Architecture Specification developed by the $I_2O$ Special Interest Group ("$I_2O$ SIG™"), which is hereby incorporated by reference in its entirety. Version 1.5 of the $I_2O$ Architecture Specification describes support for the use of scatter-gather lists in an $I_2O$ environment, and describes structures and formats for a scatter-gather list and its elements that may be used in conjunction with the present invention. In the preferred embodiment, the Simple Addressing format for scatter-gather list elements is employed, see $I_2O$ Architecture Specification, Version 1.5 (March 1997), §3.4.2.3.9. It is understood, however, that the present invention is by no means limited to implementation in an $I_2O$ architecture environment, nor to any particular scatter-gather list structure or format.

As the foregoing illustrates, the present invention is directed to methods, apparatus, and computer program products for transferring a buffer of data of length L from a first memory to a second memory such that a pad of length P is inserted after each successive portion of length S of the data is transferred. Although by its novel use of scatter-gather lists, the present invention can be readily implemented using industry-standard input/output components that support scatter-gather list processing, the present invention is by no means limited to use with industry-standard components and may be equally advantageous in proprietary environments that support scatter-gather list processing. It is understood that changes may be made to the embodiments described above without departing from the broad inventive concepts thereof. Accordingly, the present invention is not limited to the particular embodiments disclosed, but is intended to cover all modifications that are within the spirit and scope of the invention as defined by the appended claims.

What is claimed is:

1. A method for transferring a buffer of data of length L from a first memory to a second memory, wherein the second memory requires that a pad of length P be inserted after each successive portion of length S of the data is transferred, said method comprising the steps of:

generating a scatter-gather list to control the transfer of the buffer of data of length L from the first memory to the second memory, such that a pad of length P is inserted after each successive portion of length S of the data is transferred to the second memory; and performing the transfer in accordance with the generated scatter-gather list.

2. The method recited in claim 1, wherein the generated scatter-gather list comprises one scatter-gather list element for each successive portion of length S of the data to be transferred, each scatter-gather list element specifying the start of its respective portion and a length for the transfer of that portion of S plus P.

3. The method recited in claim 2 wherein the number of elements in the scatter-gather list equals (L+(S−1)) DIV S.

4. The method recited in claim 1, wherein the generated scatter-gather list comprises two scatter-gather list elements for each successive portion of length S of the data to be transferred, the first element for a given successive portion of length S specifying the transfer of that portion, and the second element specifying the transfer of a predetermined memory location of length P that represents said pad.

5. The method recited in claim 4, wherein the predetermined memory location of length P that represents said pad is the same for each successive portion of length S of the data.

6. The method recited in claim 1, wherein the first memory comprises a main memory of a computer system and the second memory comprises a secondary storage medium connected to the computer system.

7. The method recited in claim 1, wherein said performing step comprises using a memory controller of a type capable of transferring data according a scatter-gather list to perform the transfer in accordance with the generated scatter-gather list.

8. An input/output adapter for a computer system that enables a buffer of data of length L to be transferred from a main memory of the computer system to a secondary memory attached to the adapter card, the adapter card comprising:

a memory controller of a type capable of transferring data according a scatter-gather list; and a processor for generating a scatter-gather list to control the memory controller to effect the transfer of the buffer of data of length L such that a pad of length P is inserted after each successive portion of length S of the data is transferred to the secondary memory.

9. The input/output adapter recited in claim 8, wherein the processor generates a scatter-gather list comprising one scatter-gather list element for each successive portion of length S of the data to be transferred, each scatter-gather list element specifying the start of its respective portion and a length for the transfer of that portion of S plus P.

10. The input/output adapter recited in claim 9, wherein the number of elements in the generated scatter-gather list equals (L+(S−1)) DIV S.

11. The input/output adapter recited in claim 8, wherein the processor generates a scatter-gather list comprising two scatter-gather list elements for each successive portion of length S of the data to be transferred, the first element for a given successive portion of length S specifying the transfer of that portion, and the second element specifying the transfer of a predetermined memory location of length P that represents said pad.

12. The input/output adapter recited in claim 11, wherein the adapter card further comprises a local memory to which the processor and the memory controller have access, and wherein the predetermined memory location of length P that represents said pad resides in the local memory.

13. The input/output adapter recited in claim 11, wherein the predetermined memory location of length P that represents said pad is the same for each successive portion of length S of the data.

14. The input/output adapter recited in claim 8, wherein the first memory comprises a main memory of a computer system and the second memory comprises a secondary storage medium connected to the computer system.

15. A computer-readable medium having stored thereon instructions which, when executed by a processor, causes the processor to perform the following steps:

generate a scatter-gather list to control the transfer of a buffer of data of length L from a first memory to a second memory, such that a pad of length P is inserted after each successive portion of length S of the data in the buffer is transferred to the second memory; and initiate the transfer in accordance with the generated scatter-gather list.

16. The computer-readable medium recited in claim 15, wherein the program code causes the processor to generate a scatter-gather list comprising one scatter-gather list element for each successive portion of length S of the data to be transferred, each scatter-gather list element specifying the start of its respective portion and a length for the transfer of that portion of S plus P.

17. The computer-readable medium recited in claim 16 wherein the number of elements in the scatter-gather list equals (L+(S−1)) DIV S.

18. The computer-readable medium recited in claim 15, wherein the program code causes the processor to generate a scatter-gather list comprising two scatter-gather list elements for each successive portion of length S of the data to be transferred, the first element for a given successive portion of length S specifying the transfer of that portion, and the second element specifying the transfer of a predetermined memory location of length P that represents said pad.

19. The computer-readable medium recited in claim 18, wherein the predetermined memory location of length P that represents said pad is the same for each successive portion of length S of the data.

20. The computer-readable medium recited in claim 15, wherein the first memory comprises a main memory of a computer system and the second memory comprises a secondary storage medium connected to the computer system.

21. The computer-readable medium recited in claim 15, wherein said initiating step comprises initiating the transfer by a memory controller of a type capable of transferring data according the generated scatter-gather list.

* * * * *